Patented Dec. 26, 1933

1,941,035

UNITED STATES PATENT OFFICE 1,941,035

AZODYESTUFFS INSOLUBLE IN WATER AND PROCESS OF MAKING SAME

Leopold Laska and Bruno Heyn, Offenbach-on-the-Main, Germany, assignors to General Aniline Works, Inc., New York, N. Y., a corporation of Delaware No Drawing. Application April 6, 1929, Serial No. 353,250, and in Germany April 18, 1928

23 Claims. (Cl. 260—95)

Our present invention relates to new azo dyestuffs insoluble in water, corresponding probably to the general formula:

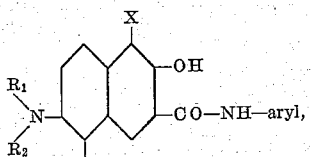

wherein $R_1$ means hydrogen or alkyl, $R_2$ hydrogen or aryl, one X hydrogen and the other X the group —N=N—aryl which group may contain a further —N=N—aryl group.

The process for producing these dyestuffs, which process is further object of our invention, comprises combining a compound of the group consisting of diazo, tetrazo and diazoazo compounds of the benzene, naphthalene and anthracene series not containing sulfonic or carboxylic acid groups with a 6-amino-2-naphthol-3-carboxylic acid arylide compound of the general formula

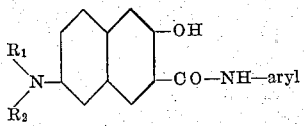

wherein $R_1$ and $R_2$ have the aforesaid signification.

Since the amino-naphthol compounds contain two combining places as shown in the above formula of the dyestuffs, two series of dyestuffs can be obtained according to the combining conditions used.

The 6-amino-2-naphthol-3-carboxylic acid arylide compounds employed as combining components in our process may be prepared by converting the 6-amino-2-naphthol-3-carboxylic acids (obtainable by treating 2.6-dihydroxy-naphthalene-3-carboxylic acid with ammonia or amines containing at least one reactive hydrogen atom at the nitrogen atom, for instance, methylamine, aniline, methyl-phenylamine etc., and homologs and substitution products of these amines) into the corresponding arylides in the customary manner, for instance, as described in U. S. Patent 1,101,111, by heating the 6-amino-2-naphthol-3-carboxylic acid or its substitution products with aromatic amines in the presence of diluents and condensing agents.

Our present process is of a peculiar technical value as it is the first time that the manufacture of green monoazo dyestuffs is successful.

The dyestuffs herein described yield valuable color lakes when mixed with the usual substrata or fast dyeings and printings on the fiber when prepared according to the ice-color method.

In order to further illustrate our invention the following examples are given, but we wish it to be understood that we are not limited to the particular products or reaction conditions mentioned therein.

Example (a) Preparation of the padding solution:

6 grs. of 6-phenylamino-2-hydroxy-naphthalene-3-carboxylic acid anilide are made into a paste with 12 cc. of Turkey red oil of 50% strength and 18 cc. of a caustic soda solution of 34° Bé. The paste is covered with 250 cc. of hot water and dissolved by boiling. Then the whole is made up to 1 liter. If the padding goods are not immediately developed after the padding process, 6 cc. of formaldehyde of 30% strength are advantageously added at about 80° to the padding solution.

(b) Preparation of the developing solution:

1,65 grs. of ortho-chloro aniline are made into a paste with 10 cc. of hot water and 2 cc. of hydrochloric acid of 20° Bé. The paste is dissolved by the addition of 40 cc. of cold water. Then the solution is cooled to 5° by means of ice and mixed while stirring with 0,77 grs. of sodium nitrite dissolved in a small quantity of water. After about 15 minutes the diazotizing reaction is finished. The diazo solution is neutralized with whiting, filtered from the excess thereof and made up to 1 liter.

(c) Dyeing process:

50 grs. of cotton yarn, unbleached, well boiled and uniformly dehydrated, are treated at 30° with the padding solution described (Sub a) for half an hour while often turning it. Then the yarn is well squeezed out between two rubber rolls and developed, while well turning it, with the neutralized diazo solution prepared according to (b). The dyed yarn is rinsed twice or thrice in the cold, then once hot. Thereafter it is soaped for half an hour with a solution containing per liter 3 grs. of soap and 1 gr. of sodium carbonate and finally it is hot and cold rinsed and dried.

In this manner an olive-green dyeing is obtained.

The same dyeing results by carrying out the combination in a solution containing sodium carbonate. A somewhat less pure shade is obtained when the combination is effected in the presence of acetic acid. In a mineral acid solution the combination yields a bluish red shade.

In an analogous manner the dyestuff may be prepared in substance.

The following table exhibits the shades of some dyeings of this kind prepared with diazo solutions which are neutralized with carbonate of lime:

| Combining component | Base to be diazotized | Shade |
|---|---|---|
| 6-Phenylamino-2-naphthol-3-carboxylic acid anilide | Alpha-naphthylamine | Dark green. |
| Do | 4-chloro-o-anisidine | Do. |
| Do | 5-chloro-o-toluidine | Green. |
| Do | p-nitraniline | Olive. |
| Do | m-nitro-p-toluidine | Do. |
| Do | m-nitro-o-anisidine | Olive-green. |
| Do | o-aminoazotoluene | Olive. |
| Do | Alpha-aminoanthraquinone | Do. |
| Do | Dianisidine | Dark green. |
| 6-Phenylamino-2-naphthol-3-carboxylic acid-o-toluidide | Alpha-napththylamine | Do |
| Do | 2.5-dichloro aniline | Bronze. |
| Do | 5-chloro-o-toluidine | Yellowish green. |
| Do | 2.4.5-trichloro aniline | Greyish brown. |
| 6-p-Tolylamino-2-naphthol-3-carboxylic acid-o-anisidide | p-nitraniline | Olive. |
| Do | p-chloro-o-anisidine | Dark green. |
| Do | 5-chloro-o-toluidine | Green. |
| Do | p-nitraniline | Olive. |
| 6-o-Chloro phenylamino-2-naphthol-3-carboxylic acid-anilide | o-aminoazotoluene | Do. |
| Do | p-nitraniline | Do. |
| 6-p-Chloro phenylamino-2-naphthol-3-carboxylic acid-o-anisidide | o-aminoazotoluene | Dark green. |
| Do | Alpha-naphthylamine | Do. |
| Do | 5-chloro-o-toluidine | Yellowish dark green. |
| Do | 4-chloro-o-anisidine | Bluish dark green. |
| Do | p-nitraniline | Olive. |
| 6-p-Chloro phenylamino-2-naphthol-3-carboxylic acid-p-chloro anilide | o-aminoazotoluene | Olive-green. |
| Do | 5-chloro-o-toluidine | Do. |
| 6-N-Methyl-phenylamino-2-naphthol-3-carboxylic acid-anilide | o-chloroaniline | Green. |
| Do | 4-chloro-o-anisidine | Dark green. |
| Do | 5-chloro-o-toluidine | Green. |
| Do | p-nitraniline | Yellowish olive. |
| Do | m-nitro-o-anisidine | Yellowish green. |
| 6-Amino-2-naphthol-3-carboxylic acid-p-toluidide | o-aminoazotoluene | Olive-green. |
| Do | o-chloroaniline | Brown. |
| Do | p-nitraniline | Bronze. |
| Do | o-aminoazotoluene | Olive-brown. |

We wish it to be understood that in the following claims the term "combining" means everywhere combining in substance or on a substratum, especially on the fiber.

Since an object of the present invention is to provide dyestuffs of good fastness properties, which dyestuffs are insoluble in water and alkalies, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are, for instance, the sulfonic acid and the carboxylic acid group.

We claim:

1. A process which comprises combining a compound of the group consisting of diazo-, tetrazo- and diazoazo-compounds of the benzene, naphthalene and anthracene series not containing sulfonic or carboxylic acid groups with a 6-amino-2-naphthol-3-carboxylic acid arylide compound of the general formula:

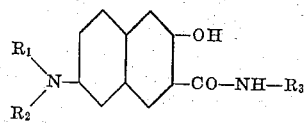

wherein $R_1$ means hydrogen or alkyl, $R_2$ hydrogen or a radical of the benzene series and $R_3$ a radical of the benzene series.

2. The azodyestuffs of the probable general formula:

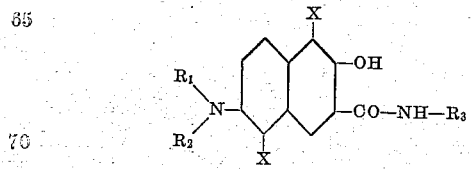

wherein $R_1$ means hydrogen or alkyl, $R_2$ hydrogen or a radical of the benzene series, $R_3$ a radical of the benzene series, one X hydrogen and the other X the group $-N=N-R-Z$, R being a radical of the benzene-, naphthalene- or anthracene series, Z being hydrogen or the group $-N=N-R_4$, wherein $R_4$ stands for a radical of the benzene series, which compounds are colored powders, insoluble in water, yielding valuable color lakes and fast dyeings and printings when produced on the fiber.

3. The azo dyestuffs of the probable general formula:

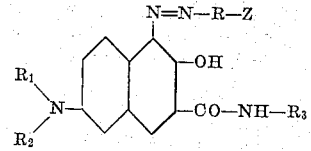

wherein $R_1$ means hydrogen or alkyl, $R_2$ hydrogen or a radical of the benzene series, $R_3$ a radical of the benzene series, R a radical of the benzene-, naphthalene- or anthracene series, Z being hydrogen or the group $-N=N-R_4$, wherein $R_4$ stands for a radical of the benzene series, which compounds are colored powders, insoluble in water, yielding valuable color lakes and fast dyeings and printings when produced on the fiber.

4. A process which comprises combining a compound of the group consisting of diazo-, tetrazo- and diazoazo compounds of the benzene-, naphthalene- and anthracene series not containing sulfonic or carboxylic acid groups with a 6-arylamino-2-naphthol-3-carboxylic acid arylide of the general formula:

wherein $R_2$ and $R_3$ stand for radicals of the benzene series.

5. The azo dyestuffs of the probable general formula:

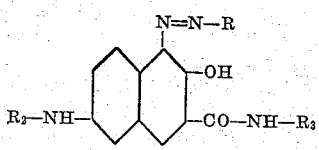

wherein R stands for a radical of the benzene-, naphthalene- or anthracene series, $R_2$ and $R_3$ for radicals of the benzene series, which compounds are greenish powders, insoluble in water, yielding valuable color lakes and fast greenish dyeings and printings when produced on the fiber.

6. The process which comprises combining a diazo compound of the benzene series with a compound of the general formula:

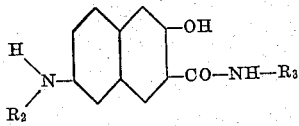

wherein $R_2$ and $R_3$ stand for radicals of the benzene series.

7. The azo dyestuffs of the probable general formula:

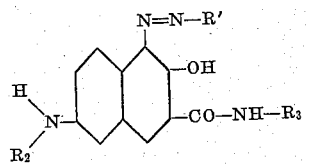

wherein R', $R_2$ and $R_3$ stand for radicals of the benzene series, which compounds are greenish powders, insoluble in water, yielding valuable color lakes and fast greenish dyeings and printings when produced on the fiber.

8. A process which comprises combining the diazo compound of 5-chloro-2-amino-toluene with a 6-arylamino-2-naphthol-3-carboxylic acid arylide of the general formula:

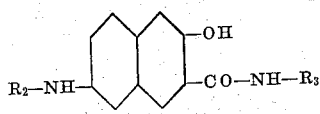

wherein $R_2$ and $R_3$ stand for radicals of the benzene series.

9. The azo dyestuffs of the probable general formula:

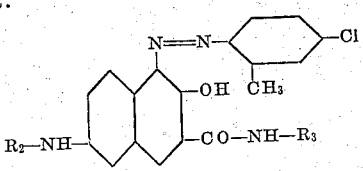

wherein $R_2$ and $R_3$ stand for radicals of the benzene series, which compounds are greenish powders, insoluble in water, yielding valuable color lakes and fast greenish dyeings and printings when produced on the fiber.

10. A process which comprises combining the diazo compound of 5-chloro-2-amino-toluene with a 6-(4'-tolyl-amino)-2-naphthol-3-carboxylic acid arylide of the general formula:

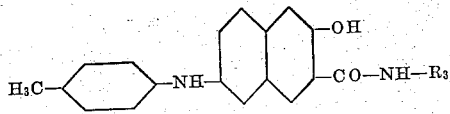

wherein $R_3$ means a radical of the benzene series.

11. The azo dyestuffs of the probable general formula:

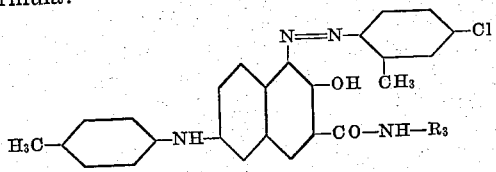

wherein $R_3$ stands for a radical of the benzene series, which compounds are greenish powders, insoluble in water, yielding valuable color lakes and fast greenish dyeings and printings when produced on the fiber.

12. A process which comprises combining the diazo compound of 5-chloro-2-amino-toluene with a 6-(4'-tolyl-amino)-2-naphthol-3-carboxylic acid-2'-anisidide of the formula:

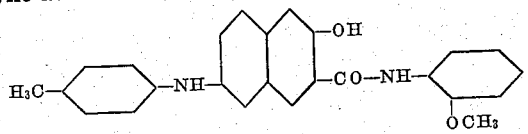

13. A process which comprises combining the diazo compound, neutralized with calcium carbonate, of 5-chloro-2-amino-toluene with a 6-(4'-tolyl-amino)-2-naphthol-3-carboxylic acid-2'-anisidide of the formula:

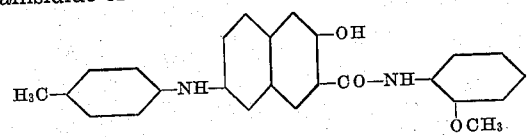

14. The azo dyestuff of the probable formula:

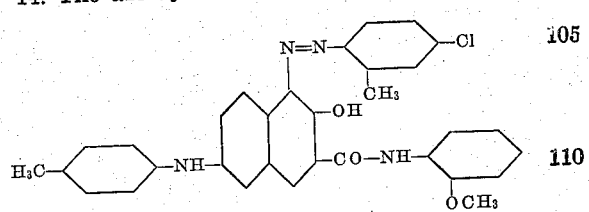

which compound is a green powder, insoluble in water, yielding valuable color lakes and fast green dyeings and printings when produced on the fiber.

15. The azo dyestuff of the probable formula:

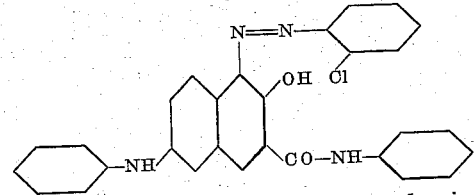

which compound is an olive-green powder, insoluble in water, yielding valuable color lakes and fast olive-green dyeings and printings when produced on the fiber.

16. Fiber dyed with the azo-dyestuffs as claimed in claim 2.
17. Fiber dyed with the azo-dyestuffs as claimed in claim 3.
18. Fiber dyed with the azo-dyestuffs as claimed in claim 5.
19. Fiber dyed with the azo-dyestuffs as claimed in claim 7.
20. Fiber dyed with the azo-dyestuffs as claimed in claim 9.
21. Fiber dyed with the azo-dyestuffs as claimed in claim 11.
22. Fiber dyed with the azo-dyestuff as claimed in claim 14.
23. Fiber dyed with the azo-dyestuff as claimed in claim 15.

LEOPOLD LASKA.
BRUNO HEYN.